(12) United States Patent
Ng

(10) Patent No.: US 9,599,154 B2
(45) Date of Patent: Mar. 21, 2017

(54) LINEAR BEARING WITH NESTED BEARING TRACKS

(71) Applicant: Thomson Industries, Inc., Amherst, NY (US)

(72) Inventor: Alison Ng, New York, NY (US)

(73) Assignee: Thomson Licensing, Inc., Amherst, NY (US)

( * ) Notice: Subject to any disclaimer, the term of this patent is extended or adjusted under 35 U.S.C. 154(b) by 0 days.

(21) Appl. No.: 14/727,158

(22) Filed: Jun. 1, 2015

(65) Prior Publication Data

US 2015/0337900 A1   Nov. 26, 2015

Related U.S. Application Data

(63) Continuation of application No. 13/810,264, filed as application No. PCT/US2011/044163 on Jul. 15, 2011, now Pat. No. 9,080,603.

(60) Provisional application No. 61/364,525, filed on Jul. 15, 2010.

(51) Int. Cl.
    *F16C 29/06* (2006.01)

(52) U.S. Cl.
    CPC ...... *F16C 29/0685* (2013.01); *F16C 29/0604* (2013.01); *F16C 29/0607* (2013.01); *F16C 29/069* (2013.01); *F16C 29/0611* (2013.01); *F16C 29/0676* (2013.01)

(58) Field of Classification Search
    CPC .............. F16C 29/0604; F16C 29/0607; F16C 29/0611; F16C 29/0676; F16C 29/0685; F16C 29/069; F16C 29/045; F16C 29/046; F16C 29/06; F16C 29/0602; F16C 29/068; F16C 29/0683
    See application file for complete search history.

(56) References Cited

U.S. PATENT DOCUMENTS

| | | | | |
|---|---|---|---|---|
| 2,655,415 | A |    | 10/1953 | Briney, Jr. |
| 4,480,879 | A | * | 11/1984 | Reith ............... F16C 29/0688 384/43 |
| 5,002,403 | A | * | 3/1991 | Hirose ............ F16C 29/0642 384/43 |
| 5,046,862 | A |    | 9/1991 | Ng |
| 5,221,145 | A | * | 6/1993 | Borel ............... F16C 29/069 384/43 |
| 5,346,313 | A |    | 9/1994 | Ng |
| 5,558,442 | A |    | 9/1996 | Ng |

(Continued)

FOREIGN PATENT DOCUMENTS

WO       0025034 A1   5/2000

*Primary Examiner* — Alan B Waits
(74) *Attorney, Agent, or Firm* — Dilworth & Barrese, LLP

(57) ABSTRACT

A linear motion bearing assembly comprising a load bearing plate structure having at least a portion of a plurality of open axial ball tracks formed therein, each of said plurality of open axial ball tracks comprised of at least two concentric ball tracks. The ball tracks including an open load bearing portion, an open return portion and turnarounds interconnecting the load bearing and return portions. A plurality of bearing balls are disposed in the ball tracks. At lease one load bearing plate is axially positioned adjacent said load bearing plate structure for receiving load from the balls disposed in the load bearing portion of the ball tracks. Various outer housing sleeves are disclosed including a structure split axially and a monolithic structure.

10 Claims, 19 Drawing Sheets

(56) References Cited

U.S. PATENT DOCUMENTS

| | | | |
|---|---|---|---|
| 5,613,780 A * | 3/1997 | Ng | F16C 29/0616 |
| | | | 29/898.03 |
| 5,829,882 A * | 11/1998 | Ng | F16C 29/069 |
| | | | 384/43 |
| 6,409,387 B1 | 6/2002 | Yokohari | |
| 2002/0067868 A1 | 6/2002 | Lyon et al. | |
| 2013/0216164 A1 * | 8/2013 | Ng | F16C 29/0607 |
| | | | 384/43 |
| 2013/0236132 A1 | 9/2013 | Ng | |

* cited by examiner

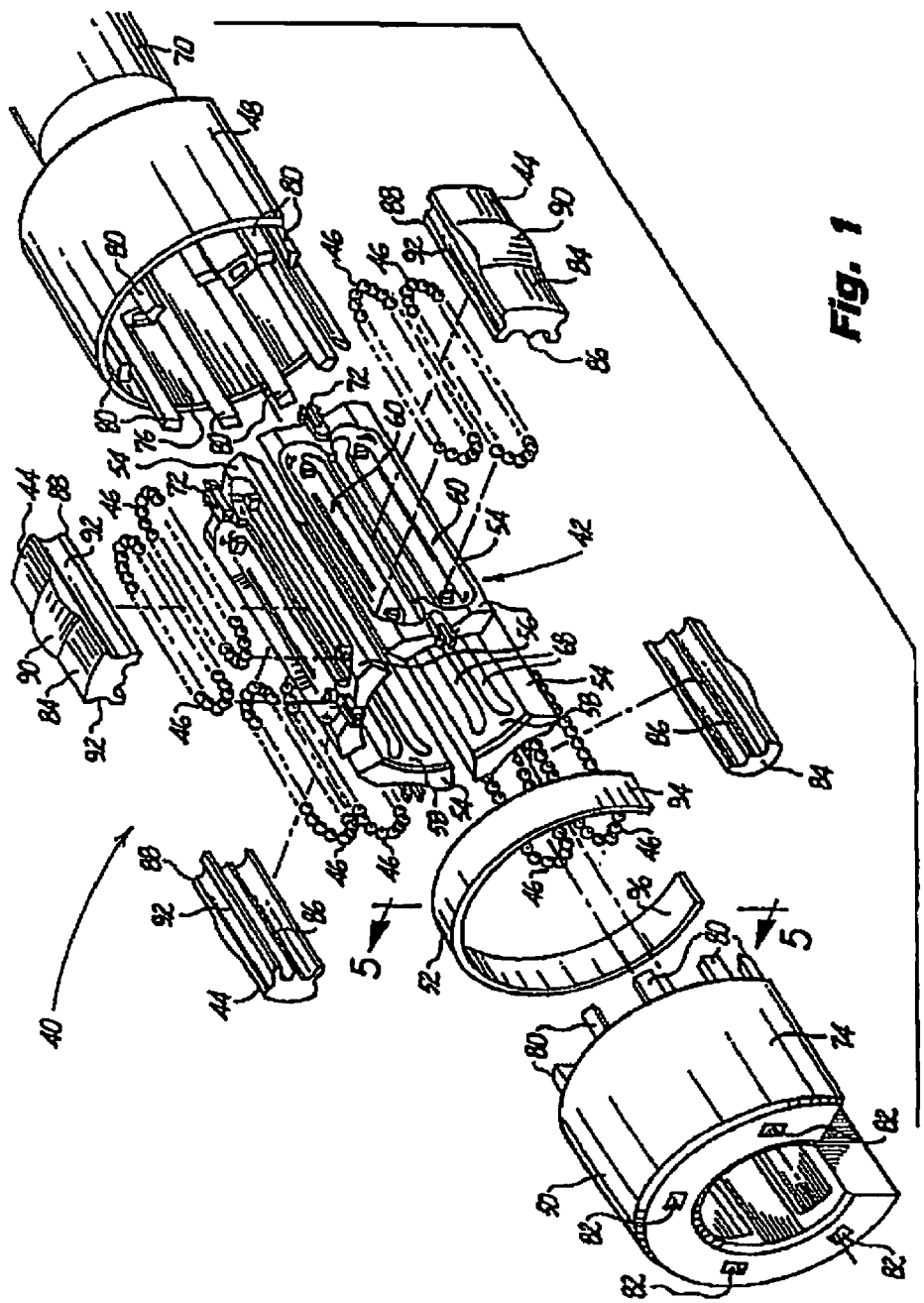

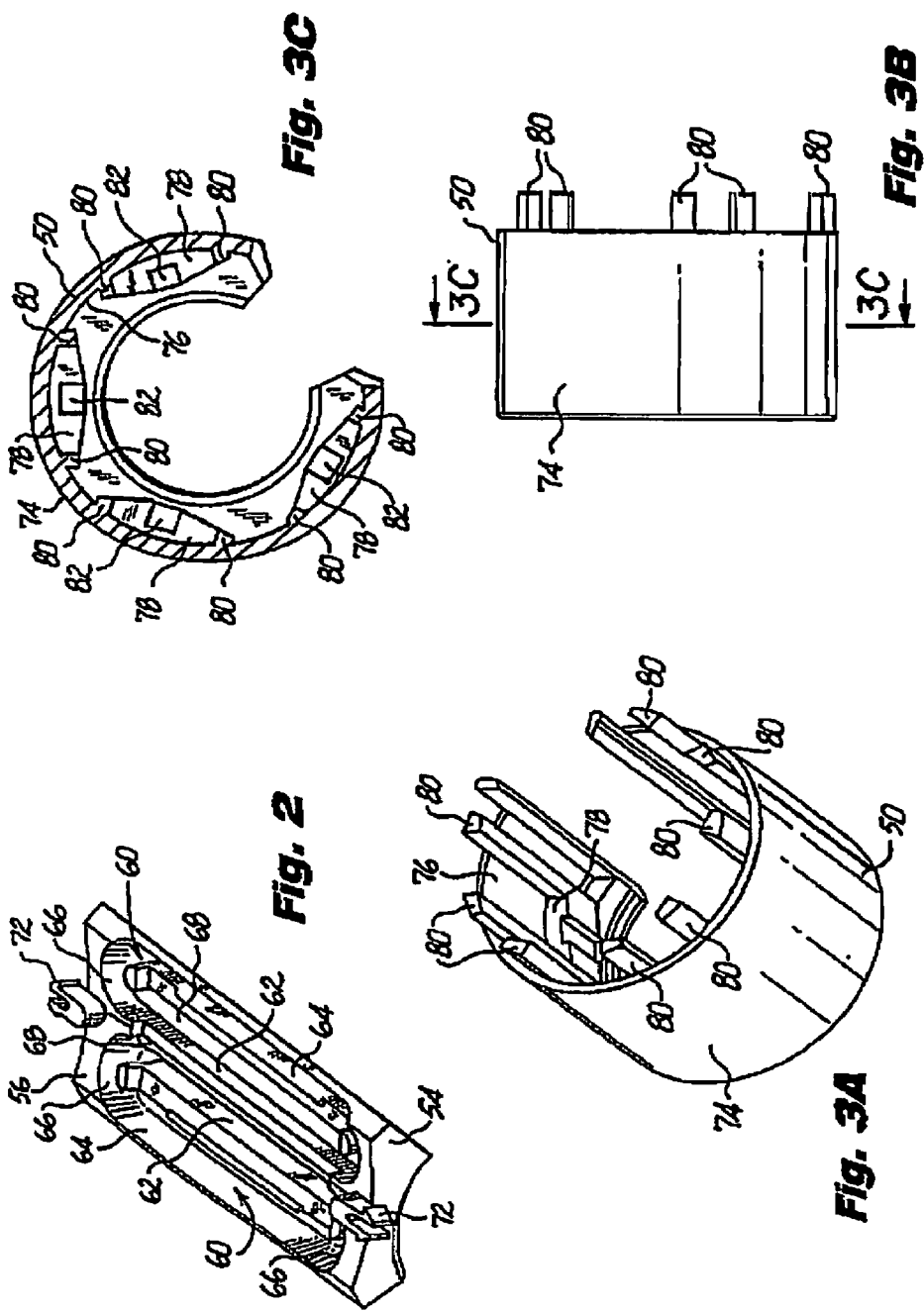

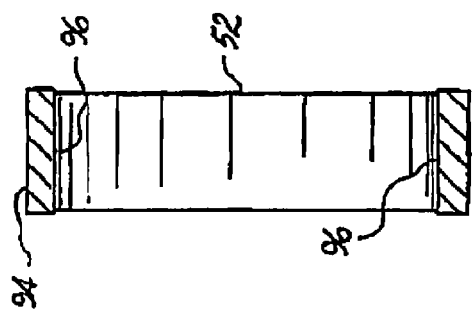
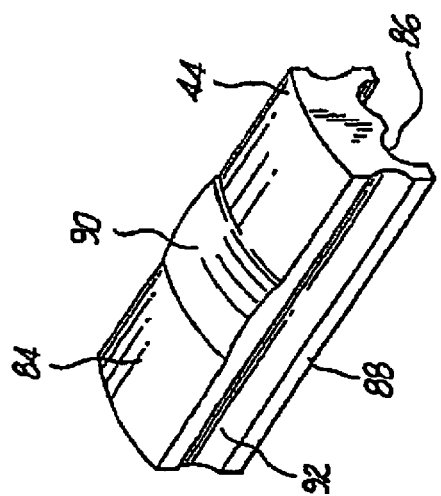
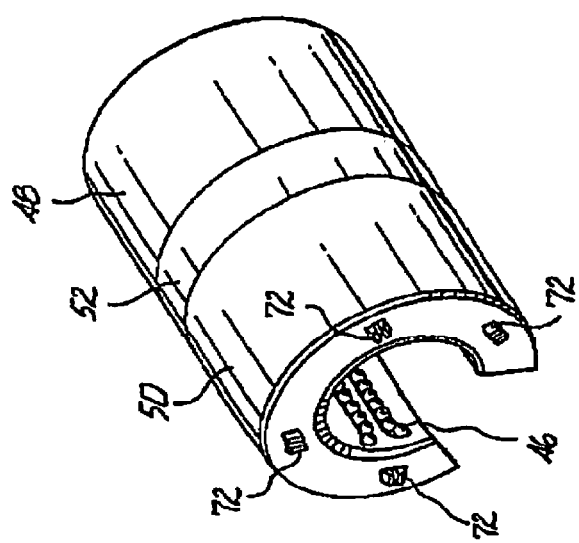

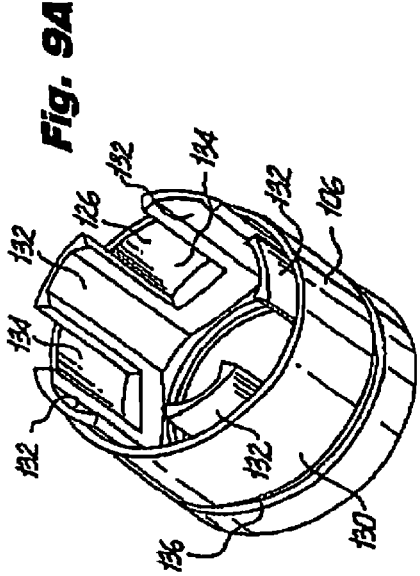
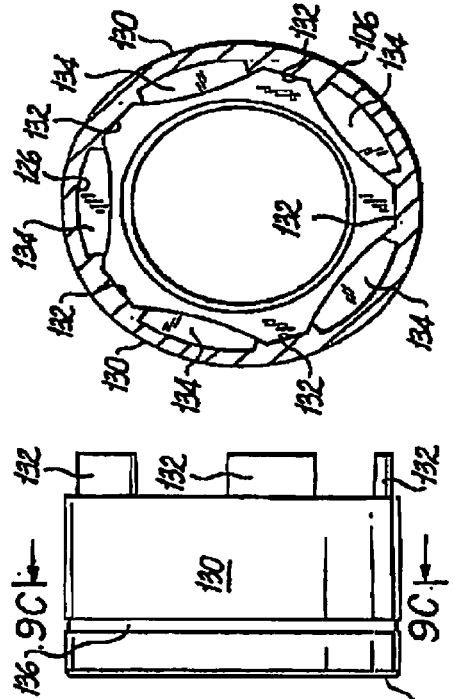
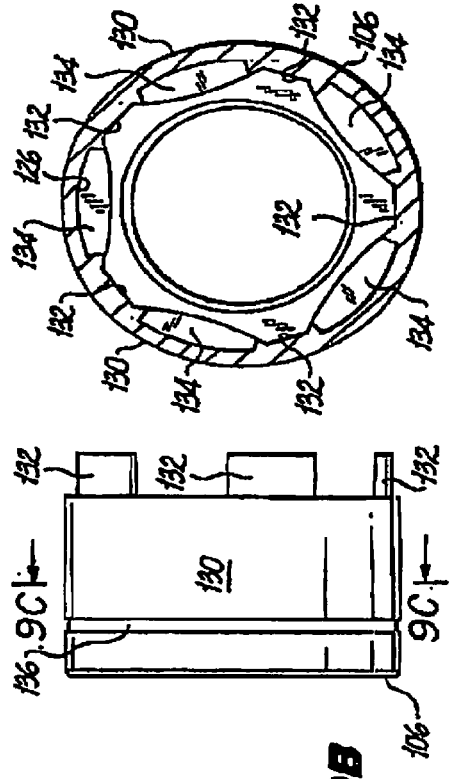
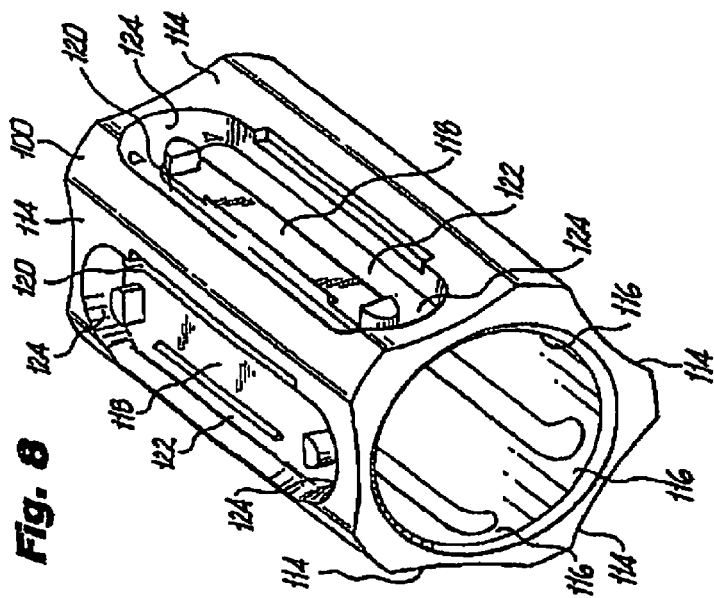

LINEAR BEARING WITH NESTED BEARING TRACKS

BACKGROUND OF THE INVENTION

Field of the Invention

This disclosure relates to a linear bearing.

Description of the Related Art

In a linear motion bearing, a generally cylindrical housing is designed to move relative to a shaft. The housing includes a load bearing plate structure comprising a plurality of ball retaining segments. Each ball retaining segment includes a plurality of ball bearings moveable in a track. The segments are mounted within the housing so that movement of the housing with respect to the shaft is effectuated through engagement of the bearings with the shaft. As the housing moves, the ball bearings move in respective tracks. This disclosure describes an improvement on these prior art systems.

SUMMARY OF THE INVENTION

One embodiment of the invention includes a linear motion bearing assembly, comprising a load bearing plate structure having at least a portion of a plurality of open axial ball tracks formed therein, each of said plurality of open axial ball tracks comprised of at least two concentric ball tracks, said ball tracks including an open load bearing portion, an open return portion and turnarounds interconnecting the load bearing and return portions; a plurality of bearing balls disposed in the ball tracks; a plurality of load bearing plates axially positioned adjacent the load bearing plate structure for receiving load from the balls disposed in the load bearing portion of the ball tracks; and a bearing plate to housing intermediary load structure enclosing substantially all of an exposed exterior surface of said load bearing plate structure and having a uniform substantially cylindrical inner surface in direct contact with said load bearing plates, said bearing plate to housing intermediary load structure being configured and dimensioned to maintain said plurality of load bearing plates in position and for receiving load directly from said load bearing plates.

BRIEF DESCRIPTION OF THE DRAWINGS

The accompanying drawings, referred to herein and constituting a part hereof, illustrate the preferred embodiments of the bearing assembly of the present invention and, together with the description, serve to explain the principles of the invention.

FIG. 1 is an exploded perspective view of a linear motion bearing assembly in accordance with one embodiment of the present invention.

FIG. 2 is a perspective view of a ball retainer segment in accordance with the linear motion bearing assembly of FIG. 1.

FIG. 3A is a perspective view of the sleeve portion of the outer housing of the linear motion bearing assembly of FIG. 1.

FIG. 3B is a side view of the sleeve portion of FIG. 3A.

FIG. 3C is a cross-sectioned view taken along line 3C-3C in FIG. 3B of the sleeve portion of FIG. 3A.

FIG. 4 is a perspective view of the load bearing plate in accordance with the linear motion bearing assembly of FIG. 1.

FIG. 5 is a cross-sectioned view of the bearing plate to housing intermediary ring taken along line 5-5 of FIG. 1.

FIG. 6 is a perspective view of the assembled linear motion bearing assembly of FIG. 1.

FIG. 8 is a perspective view of a monolithic ball retainer segment in accordance with the linear motion bearing assembly of FIG. 7.

FIG. 9A is a perspective view of the sleeve portion of the outer housing of the linear motion bearing assembly of FIG. 7.

FIG. 9B is a side view of the sleeve portion of FIG. 9A.

FIG. 9C is a cross-sectioned view taken along line 9C-C of FIG. 9B of the sleeve portion of FIG. 9A.

FIG. 16 is a perspective view of a monolithic load bearing plate structure for use with the linear motion bearing assembly of FIG. 13.

DETAILED DESCRIPTION OF PREFERRED EMBODIMENTS

Figure 5A:
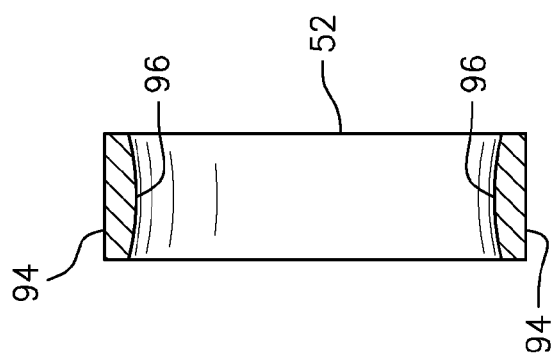
FIG. 5A is a cross-sectioned view of the bearing plate to housing intermediary ring taken along line 5-5 of FIG. 1.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Referring initially to FIGS. 1-6, there is shown a linear motion open-type bearing assembly 40 in accordance with a preferred embodiment of the present invention. The bearing assembly includes load bearing plate structure, shown generally at 42, load bearing plates 44, bearing balls 46, outer housing sleeves 48, 50 and bearing plate to housing intermediary load structure 52.

In FIGS. 1-2 details of the load bearing plate structure 42 are illustrated. In this embodiment of the present invention the load bearing plate structure 42 comprises four ball retainer segments 54, each operatively associated with adjacent ball retainer segments along longitudinal sides thereof to form a polygonally shaped load bearing plate structure having a bore therethrough for receiving a shaft 70. Each ball retainer segment 54 includes an outer radial surface 56 and an inner radial surface 58. Axial ball tracks 60 are formed in the outer radial surface 56 of each ball retainer segment 54 and include load bearing portions 62, return portions 64 and turnarounds 66. The load bearing and return portions of the ball tracks in this embodiment are undercut to facilitate loading and retention of the bearing balls 46 therein. This also eliminates the need for separate retainer structure to keep the bearing balls in the ball tracks. A longitudinal bore 68 in the inner radial surface 58 of the ball retainer segment 54 extends substantially the length of the load bearing portions 62 and accesses support shaft 70. Although support shaft 70 is illustrated as a substantially cylindrical shaft, one skilled in the art will appreciate that support members of other configurations are within the scope of the invention.

In this embodiment of the linear motion bearing assembly 40, the individual ball retainer segments 54 are easily molded from an appropriate engineering plastic using known materials and molding techniques. By individually forming each of the ball retainer segments, the molding process is greatly simplified and thus results in a lower cost to produce. It is also within the scope of the present invention to fabricate the ball bearing segments from an engineering metal using known fabrication techniques.

A plurality of bearing balls 46 are disposed in the ball tracks 60 with those bearing balls 46 in the load bearing tracks 62 extending at least partially into longitudinal bores 68 to contact support shaft 70. In this embodiment of the invention, a pair of axial ball tracks 60 are formed in each outer radial surface 56 of the ball retainer segment with the corresponding load bearing tracks being oriented in substantially parallel adjacent relation. This orientation facilitates enhanced load capacity and maximizes space utilization for a more compact and efficient bearing ball arrangement. Locking structure in the form of locking clips 72 are formed on opposing longitudinal ends of each ball retainer segment 54 to facilitate assembly with outer housing sleeves 48, 50, discussed in greater detail hereinbelow.

Referring now to FIGS. 1 and 3A-C, the linear motion bearing assembly in accordance with one preferred embodiment includes a pair of outer housing sleeves 48, 50 which, when assembled serve to close and protect the exposed outer radial surfaces 56 of load bearing plate structure 42. Preferably, each of sleeves 48, 50 are identical in configuration and are molded from an engineering plastic to facilitate ease of manufacture and assembly. However, one skilled in the art will appreciate that, when operating conditions or specific applications require, the sleeves may be made in differing configurations and/or from engineering metals.

The outer radial surface 74 of sleeves 48, 50 are preferably of a smooth cylindrical shape and are configured and dimensioned to fit within a mounting bore of a tool carriage (not shown). The inner radial surface 76 of sleeves 48, 50 include mounting surfaces 78 which are configured to receive at least a portion of load bearing plates 44 therein. These mounting surfaces 78 further include extension portions 80 which define a mounting space for bearing plate to housing intermediary load structure 52, described in greater detail below. Preferably, mounting surfaces 78 are recessed from outer radial surface 74 by a distance approximating the cross-sectioned thickness of bearing plate to housing intermediary load structure 52. In this manner, the outer housing sleeves 48, 50 and the bearing plate to housing intermediary load structure 52 combine to form a relatively smooth and uniform outer radial surface of the linear motion bearing assembly 40. See, FIG. 6.

In this embodiment of the present invention, mounting surfaces 78 are configured to fit the shape of individual ball retainer segments 54. A plurality of locking bores 82 are formed in respective ends of sleeves 48, 50 in alignment with locking clips 72 of ball retainer segments 54. Thus, when the ball retainer segments 54 are assembled into the sleeves 48, 50, locking clip 72 extends into respective locking bores 82 and assists in holding linear motion bearing assembly 40 together.

Referring now to FIGS. 1 and 4, a plurality of individual load bearing plates 44 are incorporated into the linear motion bearing assembly 40 and serve to receive load from the bearing balls 46 in contact with shaft 70. In the embodiment of FIG. 4, load bearing plate 44 is elongated along the longitudinal axis of the bearing assembly and includes an outer radial surface 84, an inner radial surface 86, and a pair of side wall surfaces 88. The outer radial surface 84 is substantially arcuate and, in a preferred embodiment, includes a crown portion 90 disposed on the outer radial surface 84 in a medial position. Crown portion 90 is configured and dimensioned to permit the load bearing plates to rock both circumferentially and longitudinally into and out of parallelism with the axes of the ball retainer 42.

The inner radial surface 86 of the load bearing plate of this embodiment is advantageously provided with a pair of axial grooves which serve as the upper surface of load bearing portions 62 of ball tracks 60. By providing a single load bearing plate 44 for each pair of load bearing portions 62 in each outer radial surface 56, the linear motion bearing assembly 40 is easier to fabricate and assemble. Further, the bearing assembly has a high load bearing capacity.

In this embodiment of the present invention, a longitudinal groove 92 is formed in each side wall surface 88 of load bearing plates 44. These grooves 92 make up a side wall of the axial ball tracks 60 and guide bearing balls 46 as they move through the return portion thereof.

Referring now to FIGS. 1, 5 and 6, bearing plate to housing intermediary load structure 52 is illustrated in a C-ring configuration having an outer radial surface 94 conforming substantially in dimension to the outer radial surface 74 of sleeves 48, 50. In this embodiment of the invention, the inner radial surface 96 is substantially parallel to the outer radial surface and is configured and dimensioned, when assembled, to contact crown portion 90 of load bearing plates 44. The radius of curvature of the crown portion 90 in the transverse direction is preferably smaller than the radius of curvature of the inner radial surface of the bearing plate to housing intermediary load structure 52. This configuration allows the plates to rock circumferentially with respect to the inner surface of the bearing plate to housing intermediary load structure 52.

Further, referring to FIGS. 1 and 6, the bearing plate to housing intermediary load structure 52 encompasses and engages extension portions 80 of sleeve 48, 50 to assist in enclosing and protecting load bearing plate structure 42. Although shown in a narrow width, it is contemplated that the bearing plate to housing intermediary load structure 52 may extend substantially the entire longitudinal length of the bearing assembly, as discussed herein below. The bearing plate to housing intermediary load structure is preferably formed of a hard abrasion resistant material such as, for example, stainless steel or ceramic. Alternatively, a softer material such as bronze or aluminum may also be used.

When the inner radial surface 96 is positioned in contact with the crown portion 90 of the load bearing plates 44, this structure acts as the primary conduit for load from the load bearing plates and transmits that load directly to the carriage (not shown) into which the bearing assembly is mounted. This configuration permits sleeves 48, 50 to be relieved from primary load bearing responsibility and can thus be fabricated from less expensive and lighter engineering plastics such as, for example, acetal or nylon. This arrangement of elements also facilitates ease of manufacture and assembly resulting in an inexpensive, highly efficient, high load capacity bearing assembly.

It is also envisioned that various seals and/or wiper structure will be incorporated into the bearing assembly to inhibit the ingress of dust, dirt or other contaminants. See, for example, U.S. Pat. No. 3,545,826 to Magee et al., the disclosure of which is incorporated herein by reference.

Figure 4A:
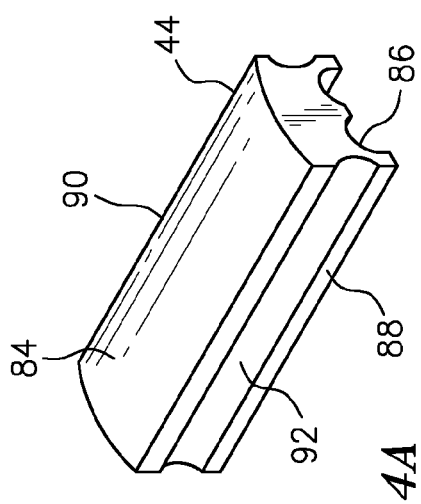
FIG. 4A is a perspective view of the load bearing plate in accordance with the linear motion bearing assembly of FIG. 1.

Referring now to FIGS. 1 and 4A, a plurality of individual load bearing plates 44 are incorporated into the linear motion bearing assembly 40 and serve to receive load from the bearing balls 46 in contact with shaft 70. In the embodiment of FIG. 4A, load bearing plate 44 is elongated along the longitudinal axis of the bearing assembly and includes an outer radial surface 84, an inner radial surface 86, and a pair of side wall surfaces 88. The outer radial surface 84 is substantially accurate and may include a crown portion 90 disposed on the outer radial surface 84 in a medial position. Crown portion 90 is configured and dimensioned to permit the load bearing plates 44 to rock both circumferentially and longitudinally into and out of parallelism with the axes of the ball retainer structure 42.

The inner radial surface 86 of the load bearing plate is advantageously provided with a pair of axial grooves which serve as the upper surface of load bearing portions 62 of ball tracks 60. By providing a single load bearing plate 44 for each pair of load bearing portions 62 in each outer radial surface 56, the linear motion bearing assembly 40 is easier to fabricate and assemble. Further, the bearing assembly has a high load bearing capacity.

In this embodiment, a longitudinal groove 92 is formed in each side wall surface 88 of load bearing plates 44. These grooves 92 make up a side wall of the axial ball tracks 60 and guide bearing balls 46 as they move through the return portion thereof.

Figure 6A:
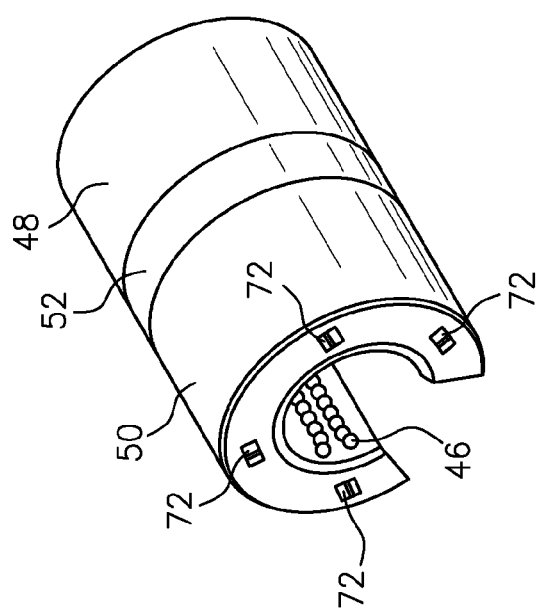
FIG. 6A is a perspective view of the assembled linear motion bearing assembly of FIG. 1.

Referring now to FIGS. 1, 5A and 6A, bearing plate to housing intermediary load structure 52 is illustrated in a C-ring configuration having an outer radial surface 94 conforming substantially in dimension to the outer radial surface 74 of sleeves 48, 50. In this embodiment, the inner radial surface 96 is substantially parallel to the outer radial surface and is configured and dimensioned, when assembled, to contact crown portion 90 of load bearing plates 44. In an example, the radius of curvature of the crown portion 90 in the transverse direction is smaller than the radius of curvature of the inner radial surface of the bearing plate to housing intermediary load structure 52. This configuration allows the plates to rock circumferentially with respect to the inner surface of the bearing plate to housing intermediary load structure 52. In other examples, crown portion 90 is substantially flat as shown in FIG. 4A.

Further, referring to FIGS. 1 and 6A, the bearing plate to housing intermediary load structure 52 encompasses and engages extension portions 80 of sleeve 48, 50 to assist in enclosing and protecting ball retainer structure 42. Although shown in a narrow width, the bearing plate to housing intermediary load structure 52 may extend substantially the entire longitudinal length of the bearing assembly. The bearing plate to housing intermediary load structure is preferably formed of a hard abrasion resistant material such as, for example, stainless steel or ceramic. Alternatively, a softer material such as bronze or aluminum may also be used.

FIGS. 7-11 illustrate a second preferred embodiment of a linear motion bearing assembly, shown generally at 98, in accordance with the present invention. Although shown as a closed-type bearing assembly, one skilled in the art will readily appreciate that the features of this bearing assembly are equally applicable to open-type bearing assemblies. The linear motion bearing assembly 98 includes a monolithic ball bearing plate to housing intermediary load structure 100, load bearing plates 102, bearing balls 104, outer housing sleeves 106, 108 and retainer structure 110.

Figure 7:
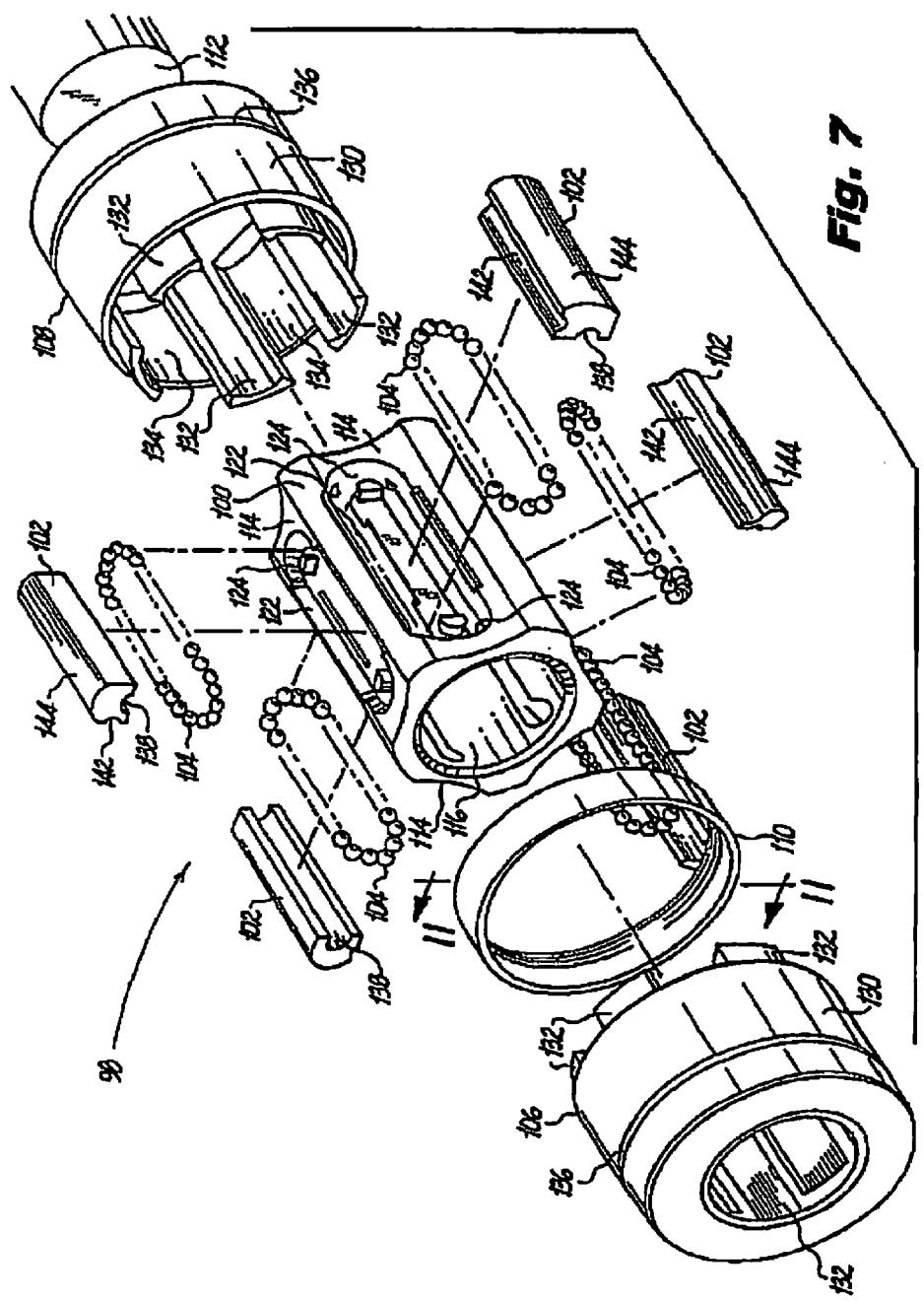
FIG. 7 is an exploded perspective view of a linear motion bearing assembly in accordance with another embodiment of the present invention.

Referring now to FIGS. 7-8, the load bearing plate structure 100 in accordance with the present invention comprises a monolithic structure having a pentagonal cross-section and defining an axial bore therethrough configured and dimensioned to receive shaft 112. The load bearing plate structure 100 includes five planar faces, each having an outer radial surface 114 and an inner radial surface 116. A single axial ball track 118 is formed in each of the five faces. Each ball track 118 includes a load bearing portion 120, a return portion 122 and a pair of turnarounds 124. The outer radial surface 114 is preferably shaped to conform to the inner radial surface 126 of outer housing sleeves 106, 108. A longitudinal channel 128 extends through the inner radial surface 116 of the load bearing portion 120 to permit bearing balls 104 therein access to shaft 112. Both the load bearing portions 120 and the return portions 122 of the ball tracks of this embodiment of the present invention are substantially open to facilitate loading of the bearing balls 104 therein.

FIGS. 7 and 9A-C show the outer housing sleeves 106, 108 in accordance with this embodiment of the present invention. As in the previously described embodiment, it is preferable that both sleeves be identical to facilitate manufacture and assembly. Sleeves 106, 108 include an inner radial surface 126 and an outer radial surface 130. Because axial ball tracks 118 are open, as opposed to undercut, upper ball track housing structure 132 is formed in the inner radial surface 126 of sleeves 106, 108. This upper ball track housing structure 132 forms an outer radial portion of the ball tracks and serves to better guide bearing balls 104 between load bearing and return portions, 120 and 122 respectively. Upper ball track housing structure 132 preferably extends axially beyond sleeves 106, 102 and is recessed from the outer radial surface 130 thereof to permit emplacement of bearing plate to housing intermediary load structure 110 discussed in detail below.

In this embodiment, cavities 134 are formed between said upper ball track housing structures 132 and configured and dimensioned to receive at least an outer radial portion of the load bearing plates 102. As in the previous embodiment, preferably each sleeve 106, 108 is monolithically formed from an engineering plastic to facilitate ease of manufacture and assembly. Where desirable, an annular groove 136 may be formed in the outer radial surface 130 of the sleeves 106, 108 to assist in mounting in carriage structure. Other known methods of mounting the bearing assembly in a carriage structure are also contemplated and include, for example, bolts, clips, pins, etc.

Figure 10:
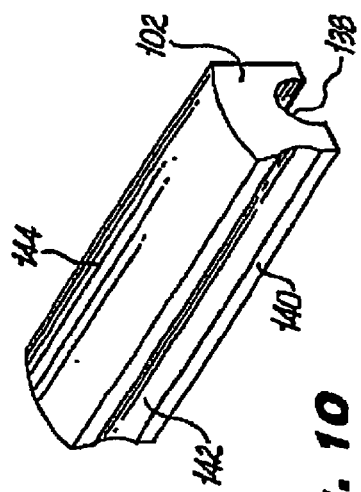
FIG. 10 is a perspective view of the load bearing plate in accordance with the linear motion bearing assembly of FIG. 7.

Referring now to FIGS. 7 and 10, load bearing plates 102 in accordance with this embodiment of the present invention are positionable between ball retainer 100 and outer housing sleeves 106, 108 in cavities 134. These load bearing plates 102 include a single longitudinal groove 138 formed on an inner radial surface thereof for contacting and guiding bearing balls 104 in the load bearing portions 120 of ball tracks 118. A side wall 140 of the load bearing plate 102 also includes a longitudinal groove 142 for guiding the bearing balls 104 in the return portion 122 of the ball tracks 118. The outer radial surface 144 of the load bearing plate 102 has a substantially smooth arcuate configuration to facilitate both axial and circumferential self alignment as will be described in greater detail hereinbelow.

Figure 11:
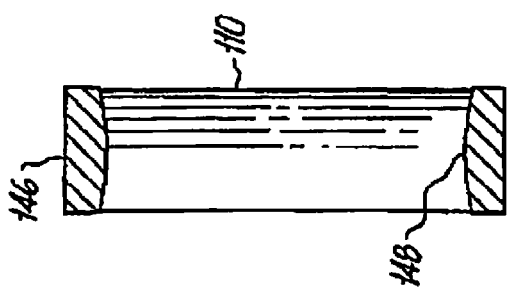
FIG. 11 is a cross-sectioned view of the bearing plate to housing intermediary ring taken along line 11-11 of FIG. 7.
Figure 12:
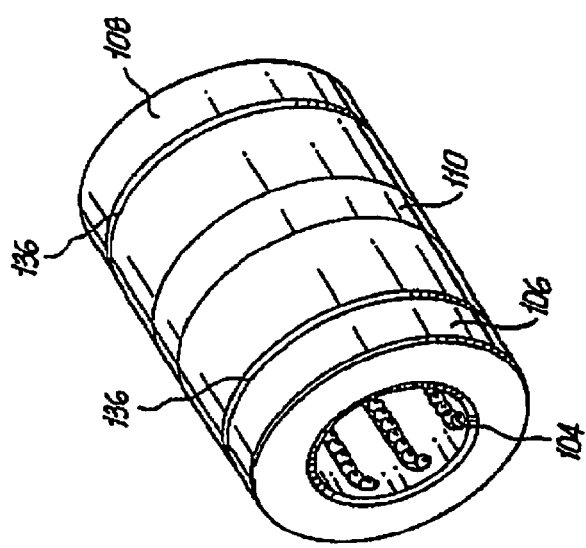
FIG. 12 is a perspective view of the assembled linear motion bearing assembly of FIG. 7.

Bearing plate to housing intermediary load structure 110 is illustrated in FIGS. 7, 11 and 12, and is shown as a generally closed ring configuration having an outer radial surface 146 conforming substantially in dimension to the outer radial surface 130 of sleeves 106, 108. The inner radial surface 148 is substantially convex when viewed in cross-section (FIG. 11) relative to the outer radial surface 146. This inner radial surface 148 is configured and dimensioned to contact the arcuate outer radial surface 144 of load bearing plates 102 when the linear motion bearing is assembled. The radius of curvature of the arcuate outer radial surface 144 of the load bearing plates 102 is preferably smaller than the radius of curvature of the inner radial surface 148 of the bearing plate to housing intermediary load structure 110. This configuration results in a contact between the arcuate outer radial surface 144 and the inner radial surface 148. This point-to-point contact permits both circumferential and axial self alignment of the bearing assembly when positioned on the shaft 112. The width of the bearing plate to housing intermediary load structure 110 is dimensioned to encompass and engage the portions of housing structure 132 extending from sleeves 106, 108 to assist in enclosing and protecting the exposed portion of load bearing plate structure 110. As in the previous embodiment, the bearing plate to housing intermediary load structure 100 is preferably formed of a hard abrasion resistant material. This facilitates the transfer of load from the load bearing plates directly to the carriage without the need for a heavy cast or forged outer housing.

Referring now to FIGS. 13-18, a closed-type linear motion bearing assembly 200 is shown incorporating an extended bearing plate to housing intermediary load structure 202 to replace the housing sections 48, 50 of the previous embodiments. The bearing assembly 200 includes a pentagonal ball retainer assembly 204 made up of five individual ball retainer elements 206. (FIG. 15) Alternatively, as shown in FIG. 16, the pentagonal ball retainer assembly 204 may be monolithically formed. A pair of ball tracks 208 are formed in each outer surface of ball retainer element 206 and comprise load bearing tracks 210 and return tracks 212 joined by turnarounds 214. Preferably, both the return tracks 212 and turnarounds 214 are undercut to facilitate maintenance of the balls 216 therein. In this embodiment, the load bearing tracks 210 of each of the ball tracks 208 are situated adjacent one another. A plurality of balls 216 are disposed in the ball tracks 208 and facilitate movement of the linear motion bearing assembly 200 along rail 218.

Figure 13:
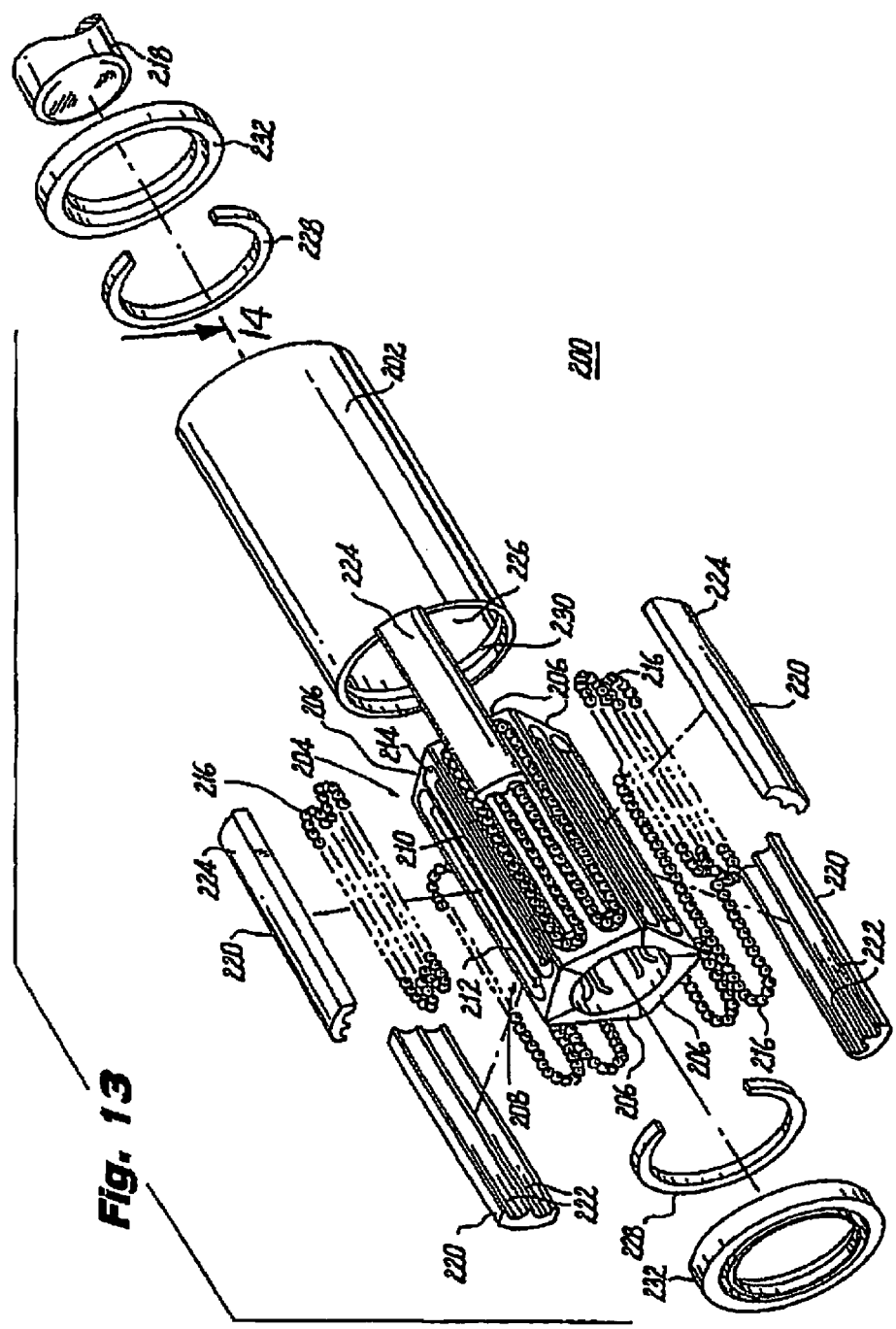
FIG. 13 is an exploded perspective view of a closed-type linear motion bearing assembly in accordance with another preferred embodiment of the present invention.
Figure 15:
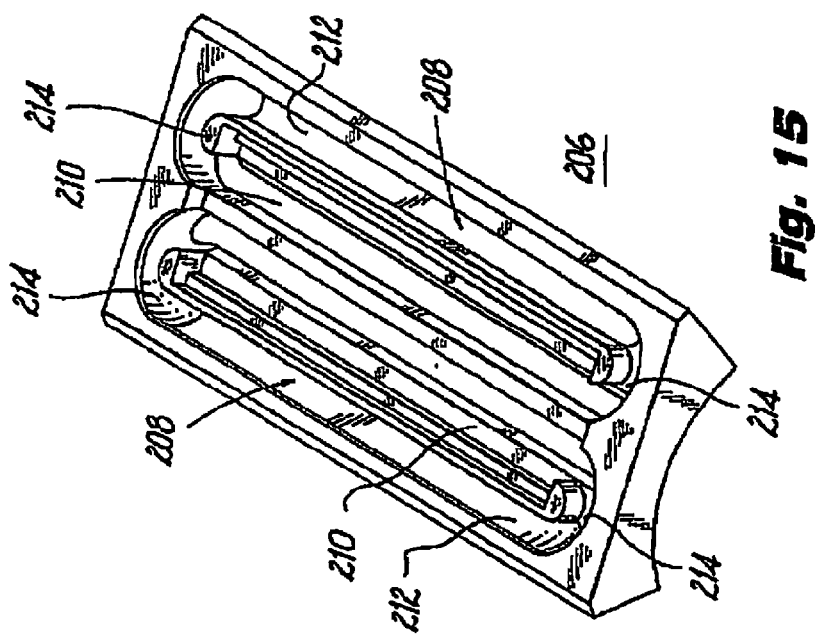
FIG. 15 is a perspective view of a ball retainer segment in accordance with the linear motion bearing assembly of FIG. 13.
Figure 14:
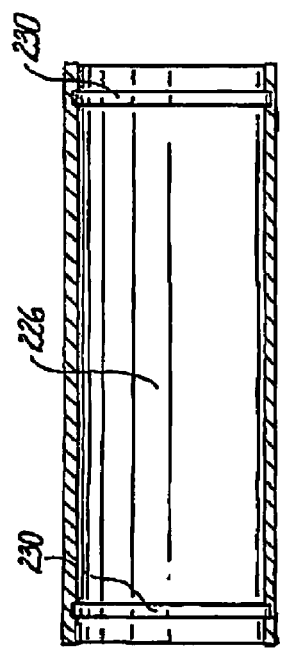
FIG. 14 is a longitudinal cross-sectioned view of the extended bearing plate to housing intermediary load structure in accordance with the linear motion bearing assembly of FIG. 13.
Figure 17:
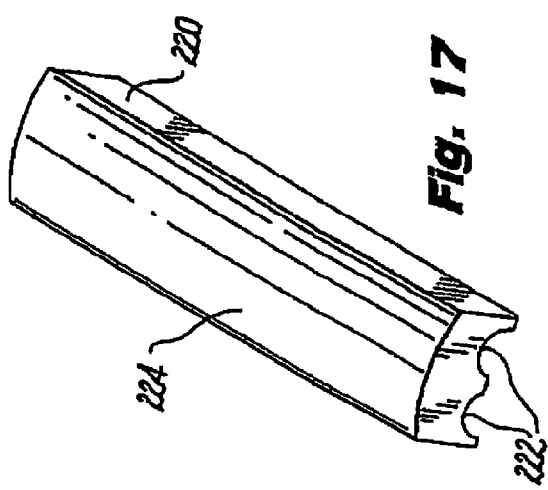
FIG. 17 is a perspective view of a load bearing plate in accordance with the linear motion bearing assembly of FIG. 13.
Figure 18:
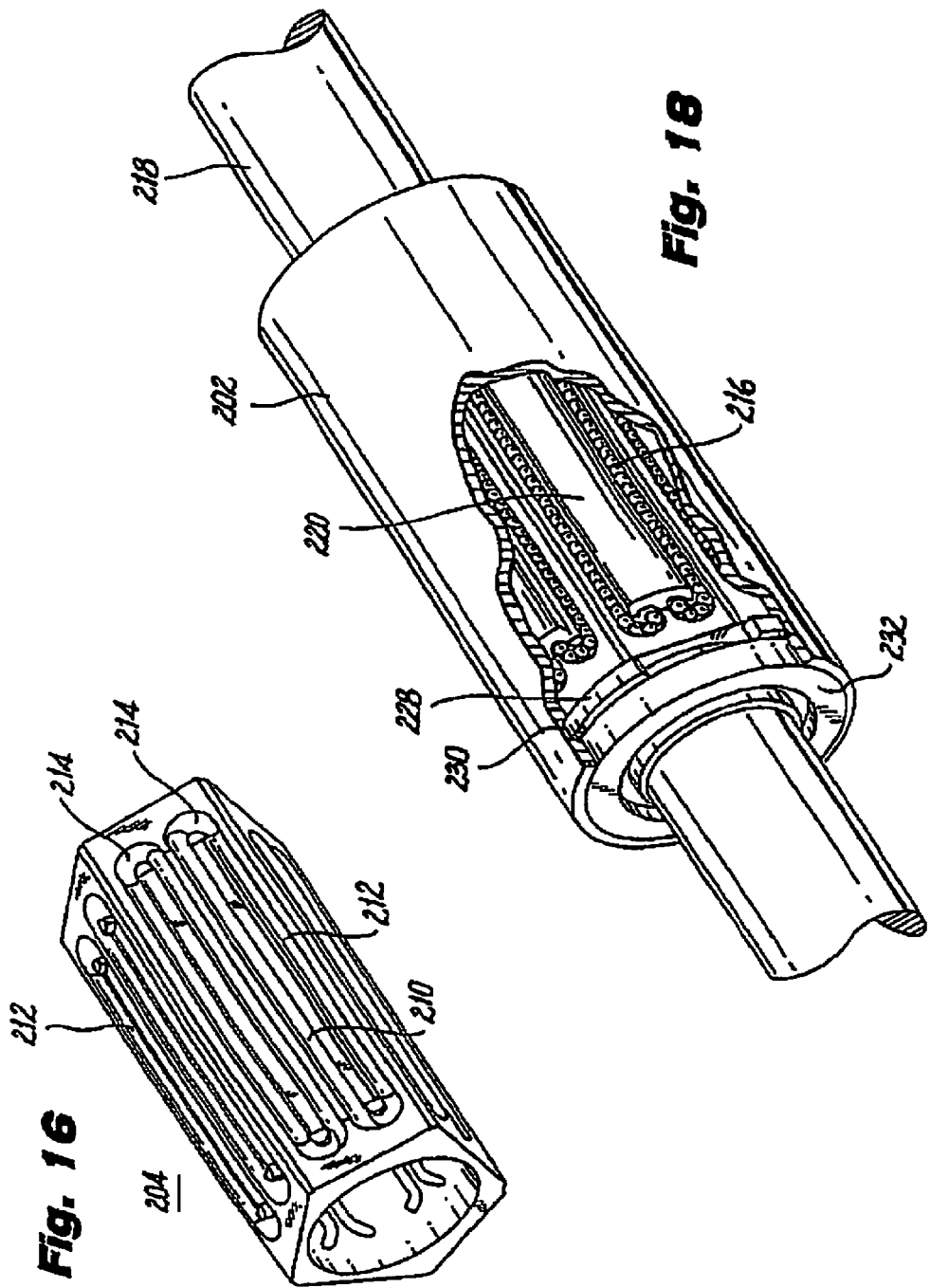
FIG. 18 is a perspective view in partial cross-section of the linear motion bearing assembly of FIG. 13 in an assembled configuration.

Referring now to FIGS. 13 and 17, the linear motion bearing assembly 200 includes a plurality of longitudinally extending load bearing plates 220. A pair of parallel axial grooves 222 are formed in an inner surface of the load bearing plates 220 and serve as the outer portion of the load bearing tracks 210. In operation, when balls 216 are disposed in the load bearing tracks 210, load is transmitted from rail 218 through balls 216 to load bearing plates 220. The outer surface 224 of the load bearing plates 220 is substantially uniform along its longitudinal length and has a radius of curvature which corresponds essentially to the radius of curvature of the inner surface 226 of the extended bearing plate to housing intermediary load structure 202. This configuration maximizes the contact between the outer surface 224 of the load bearing plates 220 and the inner surface 226 of the extended load bearing plate structure 202, thus increasing the efficiency and load transfer of the linear motion bearing assembly 200.

The pentagonal ball retainer assembly 204 is held in place within the extended bearing plate to housing intermediary load structure by end containment elements 228. In this embodiment the end containment elements include C-Rings which snap fit into transverse channels 230 formed in the inner surface 226 of the extended load bearing plate structure 202 adjacent each longitudinal end. (FIG. 14) One skilled in the art will readily appreciate that other structure may be used with equal effect including friction fit end caps, or rounding the edges of the longitudinal ends of the extended bearing plate to housing intermediary load structure to form a flange to hold in the ball retainer assembly. Also, where desired, seals 232 may be incorporated into the linear motion bearing assembly 200 to protect the balls 216 and ball tracks 208 from ambient contamination.

The extended bearing plate to housing intermediary load structure 202 is preferably in the form of an open hollow cylinder having substantially uniform inner surface 226. This extended bearing plate to housing intermediary load structure extends longitudinally to cover and enclose (FIG. 18) the pentagonal ball retainer assembly 204, the balls 216 and the load bearing plates 220. In addition, the extended bearing plate to housing intermediary load structure 202 serves to transmit loads from the outer surface 224 of the load bearing plates 220 to the carriage (not shown) in which the linear motion bearing assembly 200 is to be mounted. In this embodiment, the extended bearing plate to housing intermediary load structure is formed of aluminum. However, other materials are also envisioned including steel, bronze, plastic, brass, etc.

Figure 19:
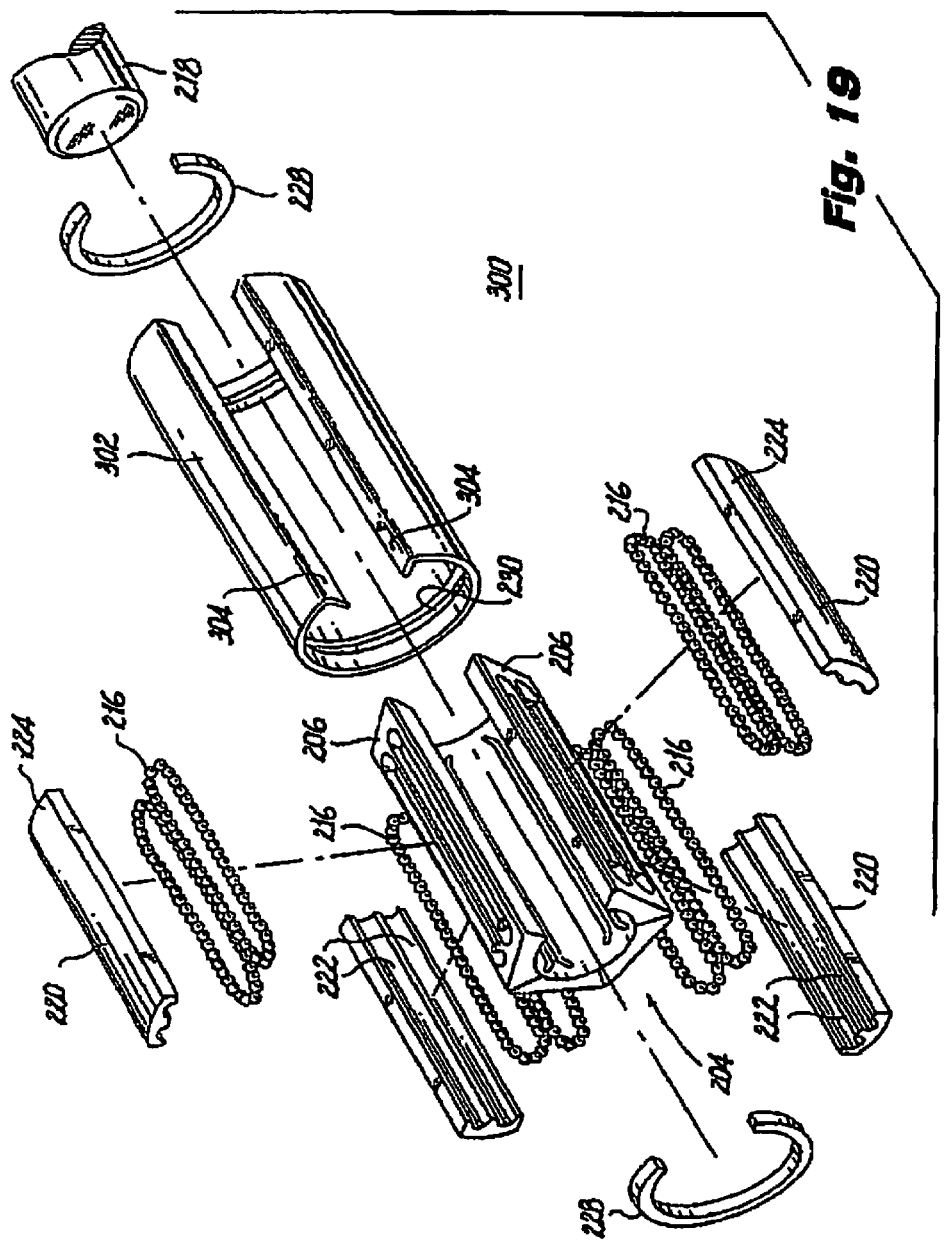
FIG. 19 is an exploded perspective view of an open-type linear motion bearing assembly in accordance with another preferred embodiment of the present invention.
Figure 20:
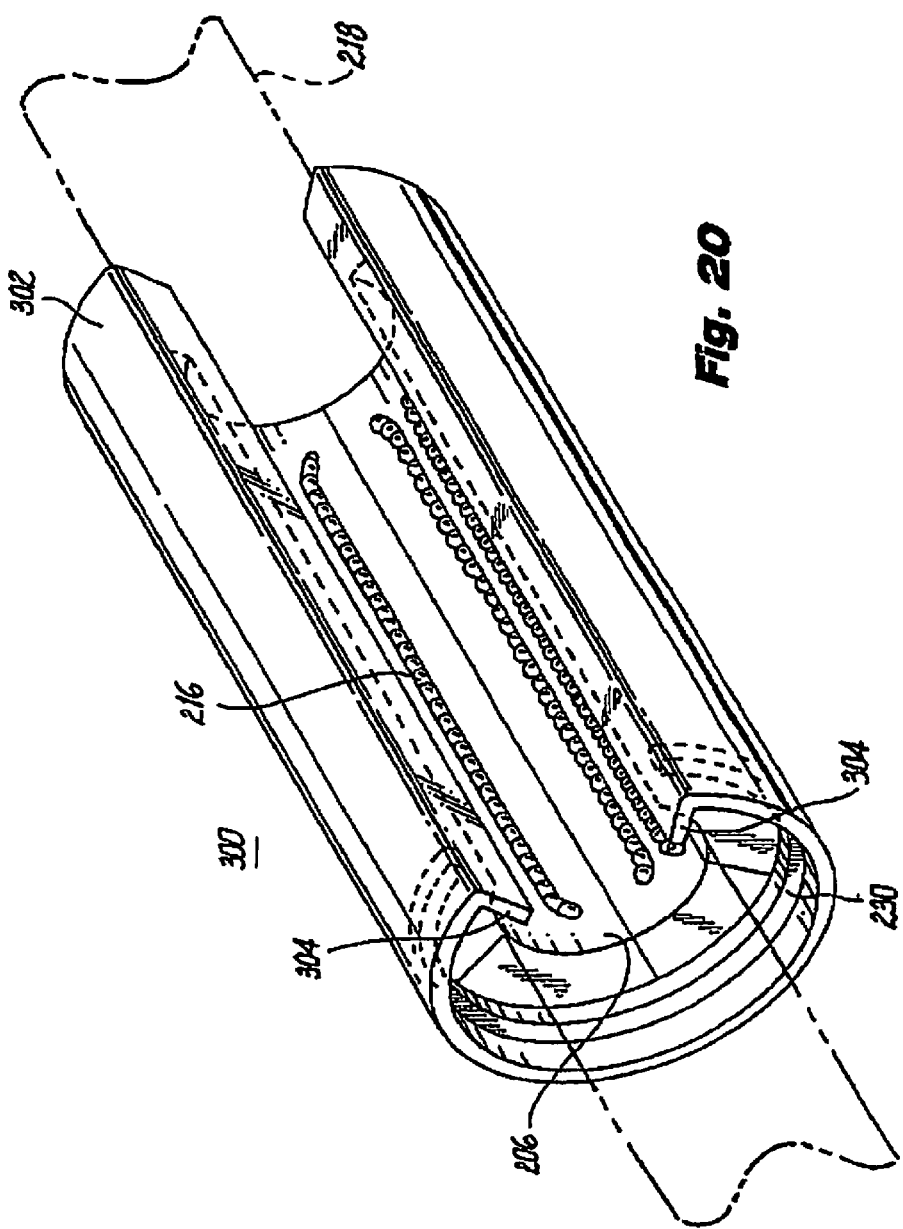
FIG. 20 is a perspective view in partial cross-section of the linear motion bearing assembly of FIG. 19 in an assembled configuration.

Turning now to FIGS. 19 and 20, an open-type linear motion bearing assembly 300 incorporating an extended bearing plate to housing intermediary load structure 302 is shown. In contrast to the closed-type embodiment shown in FIGS. 13-18, the open-type linear motion bearing assembly 300 requires a modified extended bearing plate to housing intermediary load structure 302 including a longitudinally extending opening formed therein. Transverse flanges 304 are formed along this opening to assist in retaining the individual ball retainer elements therewithin. Other than this specific change, the balance of the open-type linear motion bearing 300 is substantially the same as the closed-type bearing shown in FIGS. 13-18. The ball retainer assembly 204 remains polygonally shaped, however one face is removed to provide for the opening in the linear motion bearing assembly.

This linear motion bearing design is efficiently and easily assembled using a novel process. In one embodiment, the process includes the step of providing either a monolithic ball retainer assembly (FIG. 16) or, alternatively, a plurality of individual ball retainer elements (FIG. 15) loaded with balls 216 and load bearing plates 220. For clarity, the assembly process will be described herein with reference to a ball retainer assembly made up of individual ball retainer elements. Once the ball retainer elements 206 are fully assembled with balls 216 and load bearing plates 220, they are positioned, either simultaneously or sequentially into the extended bearing plate to housing intermediary load structure 202. Preferably, one end containment element 228 is fixed in place prior to insertion of the ball retainer elements 206. Also, a central fixture such as, for example, a shaft or rail, may be positioned within the extended bearing plate to housing intermediary load structure 202 to facilitate accurate placement of the ball retainer elements 206. In this manner, the linear motion bearing assembly 200 can be positioned vertically or substantially vertically to ease assembly.

After all of the assembled ball retainer elements 206 are in position within the extended bearing plate to housing intermediary load structure 220, the remaining end containment element 228 is set in place and the bearing assembly 200 is ready for use. Optionally, a seal 232 may be installed at either longitudinal end of the extended bearing plate to housing intermediary load structure 202 to protect the bearing assembly from ambient contamination.

Figure 21:
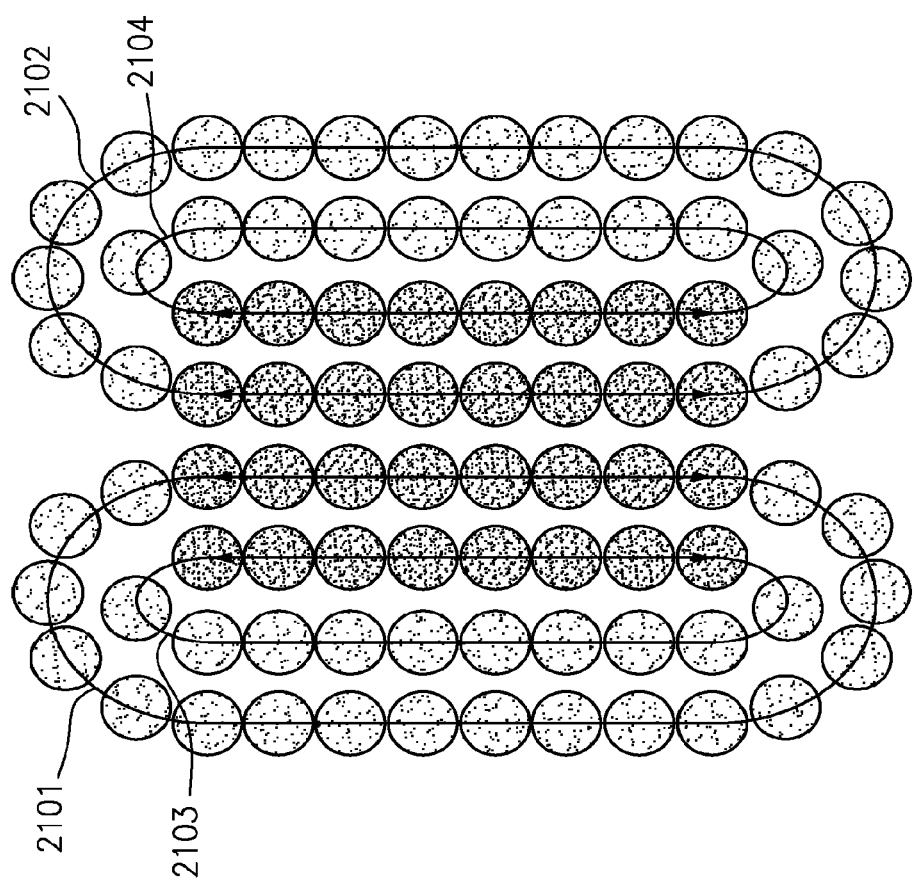
FIG. 21 is a perspective view of a linear motion bearing assembly according to a further embodiment of the present invention.

FIG. 21 is a perspective view of a linear motion bearing assembly according to a further embodiment of the present invention. The embodiment illustrated in FIG. 21 replaces the single track of bearing balls with nested tracks of bearing balls for further load bearing capacity. The embodiment illustrated in FIG. 21 is a 2×2 nested track configuration. FIG. 21 illustrates two pair of tracks. The first pair run on tracks 2101 and 2103, and the second pair run on tracks 2102 and 2104. The darker shaded bearing balls being the load bearing balls and the lighter shaded bearing balls being the recirculation balls. Each pair of bearing balls run on a twin track bearing plate similar to that shown in FIG. 17.

Figure 23:
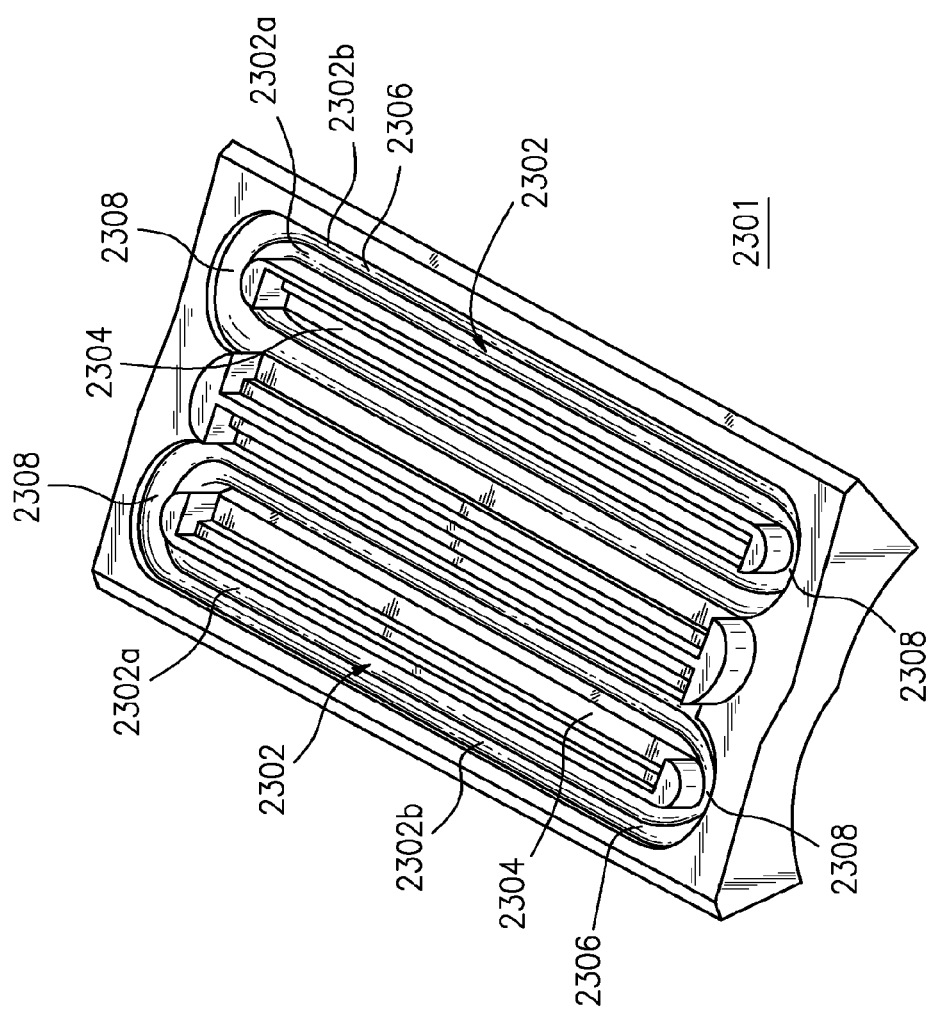
FIG. 23 is a perspective view of a ball retainer segment in accordance with the linear motion bearing assembly of FIG. 21.

FIG. 23 is a perspective view of a ball retainer segment in accordance with the linear motion bearing assembly of FIG. 21. As can be seen from FIG. 23, ball retainer segment 2301 is modified to accommodate the 2×2 pair of bearing balls. A pair of ball tracks 2302 are formed in each outer surface of ball retainer element 2301 and comprise load bearing tracks 2304 and return tracks 2306 joined by turnarounds 2308. Each pair of ball tracks 2303 are formed with two concentric ball tracks, an inner ball track 2302a and an outer ball track 2302b. The twin track bearing plate (not shown) is situated above the pair of the inner ball track 2302a and the outer ball track 2302b of each of load bearing track 2304. Preferably, both the return tracks 2306 and turnarounds 2308 are undercut to facilitate maintenance of the balls (not shown) therein. In this embodiment, the load bearing tracks 2304 of each of the ball tracks 2302 are situated adjacent one another. A plurality of balls are disposed in the ball tracks 2302 and facilitate movement of the linear motion bearing assembly along the rail.

Figure 22:
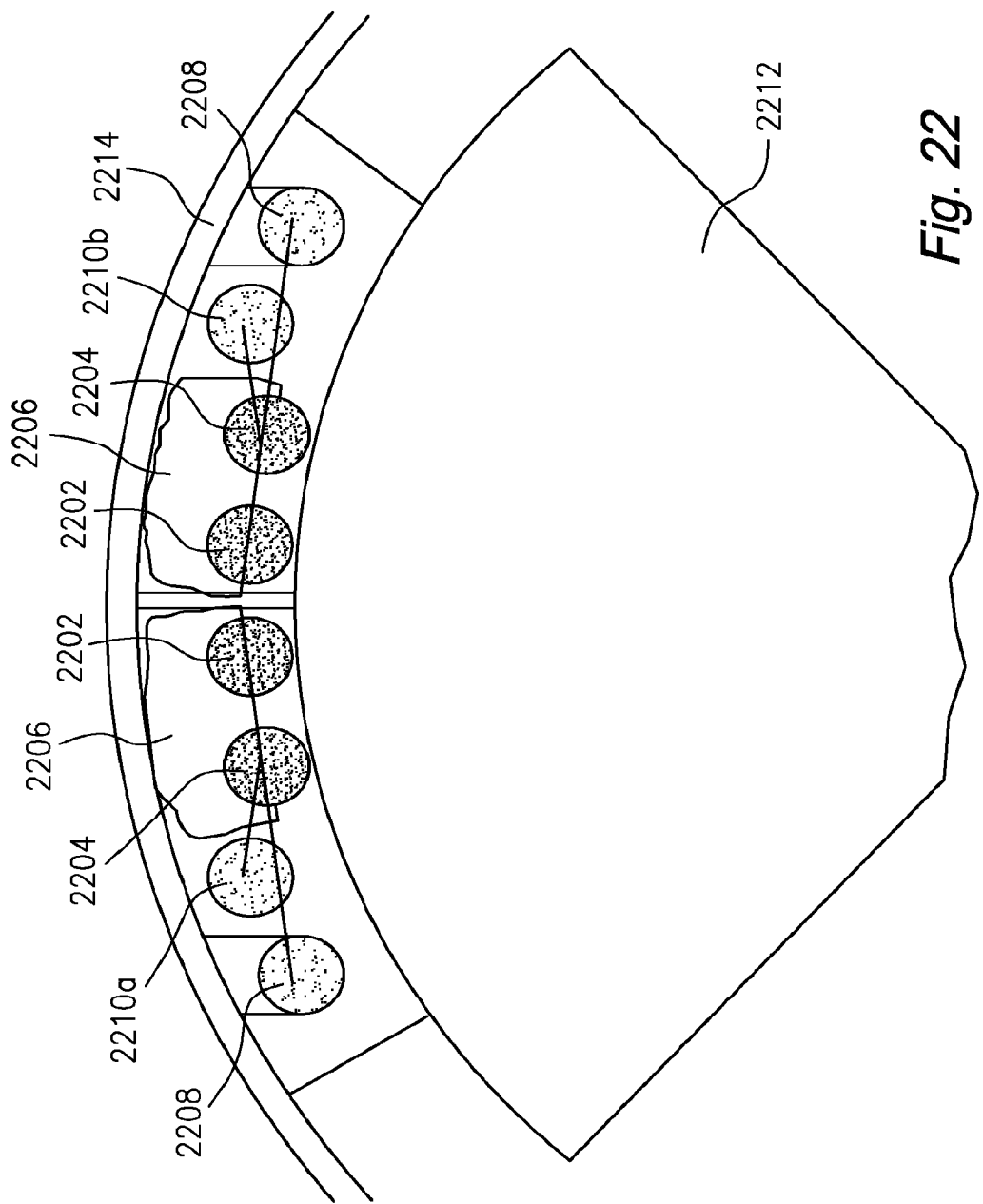
FIG. 22 is a cross sectional view of the linear motion bearing assembly according to the embodiment shown in FIG. 21.

FIG. 22 is a cross sectional view of the linear motion bearing assembly according to the embodiment shown in FIG. 21. Load bearing balls 2202 and 2204 are shown contacting rail 2212. Twin track bearing plates 2206 can pivot and roll to provide balanced loading to maintain an even load on all tracks. Recirculation balls 2210a and 2210b are shown not in contact with rail 2212. Bearing balls 2202 and 2208 run on the outer ball tracks 2302b, and bearing balls 2204 and 2210 run on the inner ball tracks 2302a. An outer housing sleeve 2214 is also shown.

Figure 24:
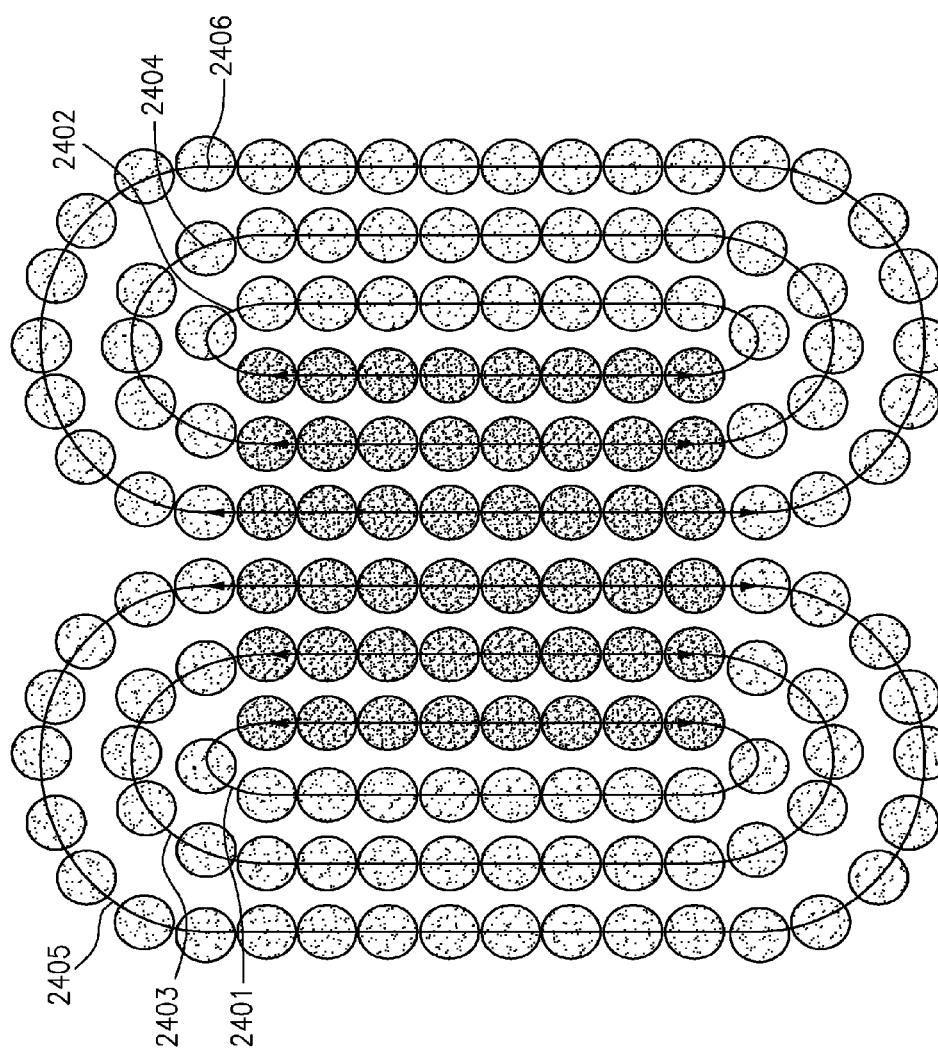
FIG. 24 is a perspective view of a linear motion bearing assembly according to a further embodiment of the present invention.

FIG. 24 is a perspective view of a linear motion bearing assembly according to a further embodiment of the present invention. The embodiment illustrated in FIG. 24 replaces the single track of bearing balls with nested tracks of bearing balls for further load bearing capacity. The embodiment illustrated in FIG. 24 is a 3×3 nested track configuration. FIG. 24 illustrates two sets of tracks. The first set runs on tracks 2401, 2403 and 2405, and the second set runs on tracks 2402, 2404 and 2406. Again, the darker shaded bearing balls being the load bearing balls and the lighter shaded bearing balls being the recirculation balls. Each set of bearing balls run on a tri-track bearing plate shown in FIG. 25.

Figure 25:
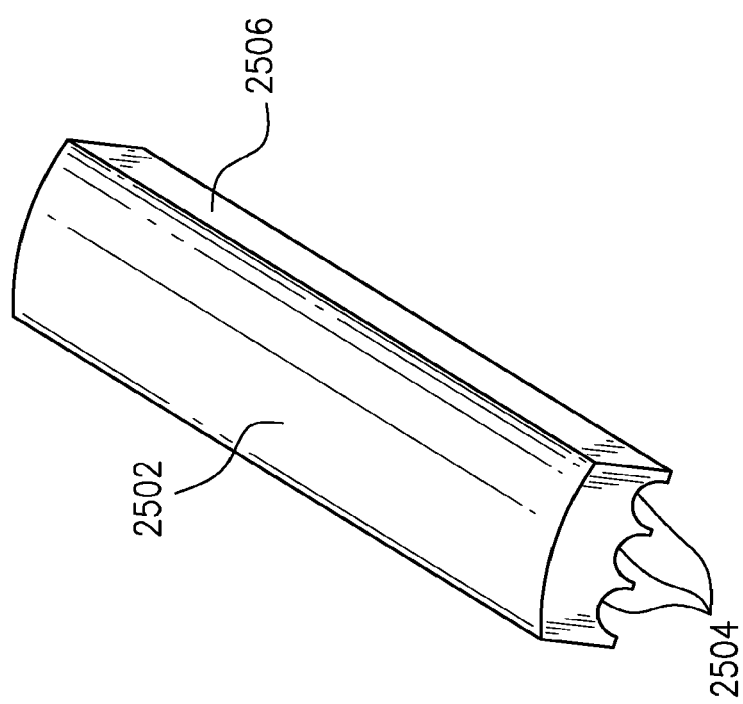
FIG. 25 is a perspective view of a load bearing plate in accordance with the linear motion bearing assembly of FIG. 24.

FIG. 25 is a perspective view of a load bearing plate in accordance with the linear motion bearing assembly of FIG. 24. The linear motion bearing assembly includes a plurality of longitudinally extending load bearing plates 2506. A set of parallel axial grooves 2504 are formed in an inner surface of the load bearing plates 2506 and serve as the outer portion of the load bearing tracks. In operation, when balls are disposed in the load bearing tracks, load is transmitted from rail through balls to load bearing plates 2506. The outer surface 2502 of the load bearing plates 2506 is substantially uniform along its longitudinal length and has a radius of curvature which corresponds essentially to the radius of curvature of the inner surface of the extended bearing plate to housing intermediary load structure. This configuration maximizes the contact between the outer surface 2502 of the load bearing plates 2506 and the inner surface of the extended load bearing plate structure, thus increasing the efficiency and load transfer of the linear motion bearing assembly.

Figure 26:
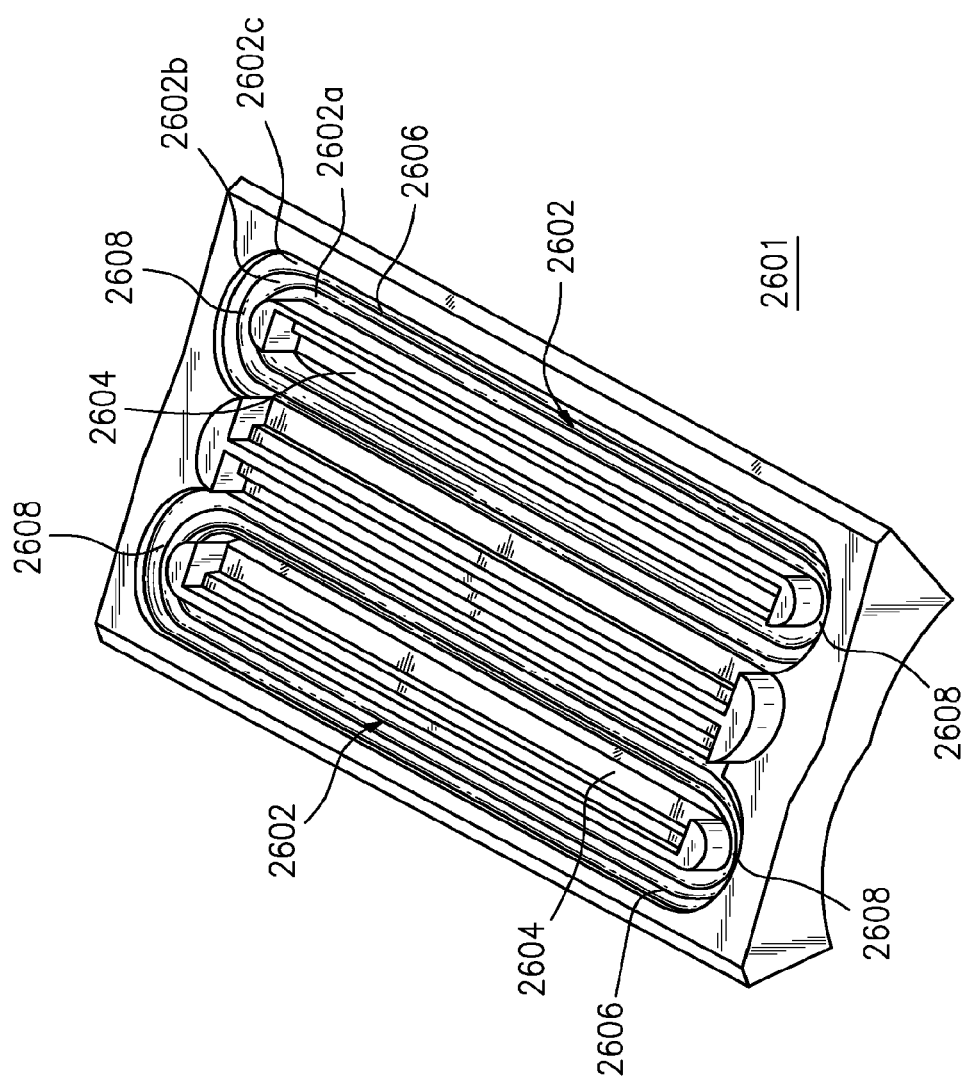
FIG. 26 is a perspective view of a ball retainer segment in accordance with the linear motion bearing assembly of FIG. 24.

FIG. 26 is a perspective view of a ball retainer segment in accordance with the linear motion bearing assembly of FIG. 24. As can be seen from FIG. 26, ball retainer segment 2601 is modified to accommodate the 3×3 pair of bearing balls. A set of ball tracks 2602 are formed in each outer surface of ball retainer element 2601 and comprise load bearing tracks 2604 and return tracks 2606 joined by turnarounds 2608. Each set of ball tracks 2603 are formed with three concentric ball tracks, an inner ball track 2602a, a middle ball track 2602b and an outer ball track 2602c. The tri-track bearing plate of FIG. 25 is situated above the set of the inner ball track 2602a, the middle ball track 2602b and the outer ball track 2602c of each of load bearing track 2604. Preferably, both the return tracks 2606 and turnarounds 2608 are undercut to facilitate maintenance of the balls (not shown) therein. In this embodiment, the load bearing tracks 2604 of each of the ball tracks 2602 are situated adjacent one another. A plurality of balls are disposed in the ball tracks 2602 and facilitate movement of the linear motion bearing assembly along the rail.

Figure 27:
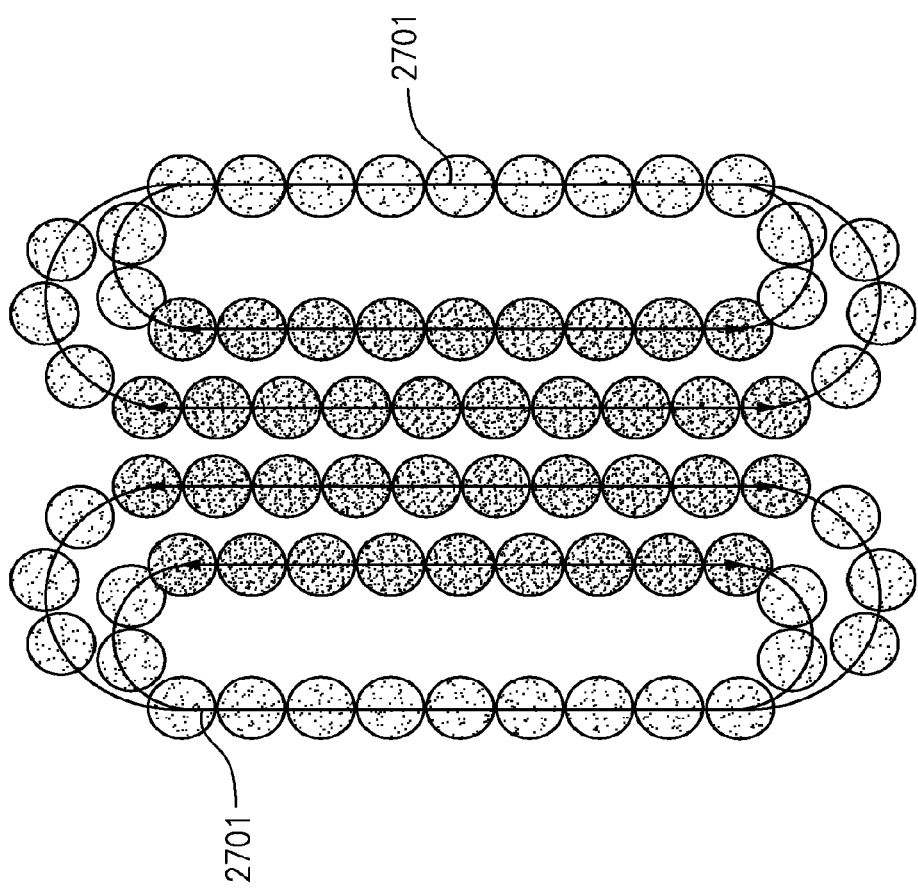
FIG. 27 is a perspective view of a linear motion bearing assembly according to a further embodiment of the present invention.

FIG. 27 is a perspective view of a linear motion bearing assembly according to a further embodiment of the present invention. Again in FIG. 27 is shown a 2×2 nested track configuration. FIG. 27 differs from the 2×2 nested track configuration of FIG. 21 in that the embodiment in FIG. 27 has a common return path. That is, bearing balls from both the inner ball track and the outer ball track are circulated on the common return path 2701. A certain specific geometry with tight tolerance control or a switching means (e.g. a magnetic guide door) may be used to ensure that the balls go into or come out of the proper path/channel to ensure there is no lock up of ball movement. This common return enables bearings to have more loaded working balls for a given envelope.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A linear motion bearing assembly, comprising:
   a load bearing plate structure having at least a portion of open axial ball tracks formed therein, said open axial ball tracks comprised of at least two concentric ball tracks, said ball tracks each including an open load bearing portion, an open return portion and turnarounds interconnecting the load bearing and return portions;
   a plurality of bearing balls disposed in the ball tracks;
   a plurality of load bearing plates axially positioned adjacent the load bearing plate structure for receiving load from the balls disposed in the load bearing portion of the ball tracks;
   a bearing plate to housing intermediary load structure having a uniform substantially cylindrical inner surface in direct contact with said load bearing plates, said bearing plate to housing intermediary load structure being configured and dimensioned to maintain said plurality of load bearing plates in position and for receiving load directly from said load bearing plates; and
   said concentric ball tracks (2302a, 2302b) are positioned such that balls (2202, 2204) in the load bearing portions are located most radially inwardly, balls (2210a, 2210b) in return portions immediately adjacent the load bearing portions are located most radially outwardly, and balls (2208) in outermost return portions are located radially between the balls (2202, 2204) in the load bearing portions and the balls (2210a, 2210b) in the return portions immediately adjacent the load bearing portions.

2. The linear motion bearing assembly of claim 1 having two concentric ball tracks.

3. The linear motion bearing assembly of claim 2 wherein two sets of two parallel axial grooves are formed in an inner surface of the plurality of load bearing plates which serve as the outer portion of the load bearing tracks.

4. The linear motion bearing assembly of claim 2 wherein twin track bearing plates can pivot and roll to provide balanced loading to maintain an even load on all tracks.

5. The linear motion bearing assembly of claim 2 wherein the respective load bearing portions of the two pair of two open axial ball tracks are arranged in parallel along a common longitudinal axis.

6. The linear motion bearing assembly of claim 1 having three concentric ball tracks.

7. The linear motion bearing assembly of claim 6 wherein two sets of three parallel axial grooves are formed in an inner surface of the plurality of load bearing plates which serve as the outer portion of the load bearing tracks.

8. The linear motion bearing assembly of claim 1 wherein a set of parallel axial grooves are formed in an inner surface of the plurality of load bearing plates which serve as the outer portion of the load bearing tracks.

9. A linear motion bearing assembly for movement along comprising the linear motion bearing assembly of claim 1.

10. The linear motion bearing assembly of claim 1 wherein the balls (2202, 2204) in the load bearing portions are located closest to a rail (2212), the balls (2210a, 2210b) in the return portions immediately adjacent the load bearing portions are located furthest from the rail (2212), and the balls (2208) in the outermost return portions are located at a distance from the rail (2212) between the balls (2202, 2204) in the load bearing portions and the balls (2210a, 2210b) in the return portions immediately adjacent the load bearing portions.

* * * * *